United States Patent [19]

Johnson et al.

[11] Patent Number: 5,390,302
[45] Date of Patent: Feb. 14, 1995

[54] TRANSACTION CONTROL

[75] Inventors: James E. Johnson, Acton, Mass.; Mark A. Howell, Linlithgou; Christopher Whitaker, Basingstore, both of United Kingdom

[73] Assignee: Digital Equipment Corporation, Maynard, Mass.

[21] Appl. No.: 61,754

[22] Filed: May 13, 1993

Related U.S. Application Data

[63] Continuation of Ser. No. 658,733, Feb. 21, 1991, abandoned.

[51] Int. Cl.$^6$ ............................................. G06F 15/00
[52] U.S. Cl. ................................... 395/325; 395/575; 364/DIG. 1
[58] Field of Search ............... 395/275, 325, 575, 650, 395/600, 725, 200; 382/1

[56] References Cited

U.S. PATENT DOCUMENTS

| | | | |
|---|---|---|---|
| 4,471,427 | 9/1984 | Harris | 395/275 |
| 4,573,192 | 2/1986 | Roth et al. | 382/1 |
| 4,604,696 | 8/1986 | Suganuma et al. | 364/401 |
| 4,787,033 | 11/1988 | Bomba et al. | 395/325 |
| 4,831,582 | 5/1989 | Miller et al. | 395/600 |
| 4,855,903 | 8/1989 | Carleton et al. | 364/200 |
| 4,855,906 | 8/1989 | Burke | 395/600 |
| 4,891,787 | 1/1990 | Gifford | 364/900 |
| 4,925,311 | 5/1990 | Neches et al. | 395/650 |
| 5,031,098 | 7/1991 | Miller et al. | 364/405 |
| 5,056,000 | 10/1991 | Chang | 395/325 |
| 5,056,058 | 10/1991 | Hirata et al. | 395/325 |
| 5,062,037 | 10/1991 | Shorter et al. | 395/325 |
| 5,093,913 | 3/1992 | Bishop et al. | 395/650 |
| 5,095,421 | 3/1992 | Freund | 395/650 |
| 5,109,384 | 4/1992 | Tseung | 395/575 |
| 5,109,515 | 4/1992 | Laggis et al. | 395/725 |
| 5,113,522 | 5/1992 | Diwiddie, Jr. et al. | 395/700 |
| 5,148,545 | 9/1992 | Herbst et al. | 395/725 |
| 5,155,858 | 10/1992 | DeBruler et al. | 395/800 |
| 5,201,044 | 4/1993 | Frey, Jr. et al. | 395/575 |
| 5,212,789 | 5/1993 | Kago | 395/600 |
| 5,222,217 | 6/1993 | Blount et al. | 395/575 |
| 5,283,899 | 2/1994 | Cook et al. | 395/650 |

FOREIGN PATENT DOCUMENTS 0320607  6/1989  European Pat. Off. ..... G06F 15/18

OTHER PUBLICATIONS

C. Mohan, "Transaction Management In The R Distributed Database Management System"; ACM Transaction on Database Systems, vol. 11, No. 4, Dec. 1986; the whole document.

B. Bhargava, "The Raid Distributed Database System"; IEEE Transactions on Software Engineering, vol. 15, No. 6, Jun. 1989, pp. 726–736.

P. Ancilotti, "An Approach To Efficient Distributed Transactions"; Distributed Computing, vol. 2, No. 4, Aug. 1988, Berlin De pp. 201–212; the whole document.

D. A. Egolf, "The Analysis Of A Commercial Implementation Of Multiple 2 Phase Commitment Protocols Within A Single Operating System Integrity Control Layer"; 8th Annual International Phoenix Conference Proceedings, 22 Mar. 1989, Scottsdale, Ariz., US, pp. 497–501; the whole document.

Primary Examiner—Allen R. MacDonald
Assistant Examiner—Tariq Hafiz
Attorney, Agent, or Firm—Clayton L. Satow; Barry N. Young

[57] ABSTRACT

A transaction management protocol for a multi-processor computer system in which the processors are organized in multi-level hierarchy for implementing the transaction, the protocol being a modification and elaboration of the Presumed Abort (PA) protocol. A coordinating processor is permitted to forget the participation of a subordinate as soon as the protocol has reached the point at which the subordinate's actions on recovery from a crash would be independent of the outcome (commit or abort) of the protocol.

4 Claims, 1 Drawing Sheet

TRANSACTION CONTROL

This application is a continuation of application Ser. No. 07/658,733, filed Feb. 21, 1991, now abandoned.

BACKGROUND OF THE INVENTION

The present invention relates to the control of transaction processing in distributed computer systems, and more particularly to a transaction management protocol optimization for reducing the time necessary to retain transaction history information.

GENERAL BACKGROUND

Many computer systems are distributed; that is, they consist of a number of distinct processors coupled to each other by a communication network. In such systems, different processors may store different data records, and certain transactions will often require the accessing of information stored at more than one processor.

Since the present invention is concerned with distributed systems, the background discussion will, for convenience, be largely in terms of such systems, though it will be realized that some of the background problems and techniques are more widely applicable.

FAILURE RECOVERY

Such systems are often liable to failures, usually as a result of one or more of the processors "crashing" or of a failure of the communication system; such failures are normally temporary. A common cause of such crashes is the failure of the software of one of the processors, which may be anything from a large mainframe to a personal computer. It is highly desirable for the system to be organized in such a manner that it can largely recover from such failures.

To understand how such recovery can be achieved, it is necessary to consider in more detail the operation of the system and the processors forming the system. This involves two aspects of the system: the organization of the operations occurring in and data stored in the system, and the nature of the hardware of the processors.

The operation of the system can generally be regarded as divided into a large number of largely independent fundamental operations each of which is of finite length; also, the information stored in the system can largely be regarded as divided into a large number of largely independent data records, each of which is located at a single processor. Thus a system failure (either a communication system failure or a processor crash) will interrupt only a small number of operations, and only a small number of data records will be active (being accessed by the interrupted operations).

A failure of the communication system will generally manifest itself by the cessation of messages between certain processors. Each of the processors which such a failure affects can detect the failure by various mechanisms, including a time-out mechanism which will detect when an operation which is running on that processor has been active for longer than some preset maximum time. A failure of a processor will generally be a software failure, which will result in some operation on that processor stopping. The operating system may be able to detect this and carry out an automatic restarting of the processor.

The processors of such systems invariably have both permanent and volatile storage; the permanent storage is generally disc storage of some sort, while the volatile storage is generally semiconductor storage. The failure of such a processor will normally result in the loss of the information in volatile storage, but will leave the information in permanent storage unaffected. (The failure of the communication system will leave all information unaffected.) The active data records (i.e. those being accessed by active operations) will generally be in volatile storage, and will thus be lost on a failure. Data records not involved in any currently active operation will generally be in permanent storage, and not affected.

The fundamental operations are therefore designed so that they are reasonably small, and they and the operating systems are so designed that the relevant data records are stored on permanent storage at the beginning and end of each operation. (A user program may obviously consist of a sequence of such operations.) Further, the operating system includes a resource manager designed to generate and store on permanent storage sufficient reference information to enable the data records stored on permanent storage to be identified after a failure and restart. In the event of a failure, therefore, the processors affected can be restarted from known states. More specifically, a processor that has crashed can be restarted from a known state, and any other processors that were running operations which were interacting with the crashed processor can have those operations restarted from corresponding known states.

Building in recovery techniques involves appreciable system overheads, in additional operations on individual processors, in additional messages between processors, and in reduced speed of the system. This is particularly significant because a fundamental "user operation" typically requires a sequence of fundamental base (system) operations, each of which has to be individually recoverable. Hence although the general principles of recovery from failure in such systems are well known, there is a great deal of scope for optimization of the recovery techniques.

DEADLOCKS

Another problem which arises in such systems is that of deadlocks. An operation may "lock" a data record for its own exclusive use. For example, in an accounting system, if a balance is to be reduced by a given amount, the current balance is read, the value is reduced by the given amount, and the new balance is written back into the record. The record must be locked for this process, to prevent a second, similar, process from reading the same original balance, reducing it by the amount given in that process, and writing the result back over the amount written back by the first process, so erasing the effect of the first process.

In such systems, it is possible for a deadlock to occur. A simple example is if process A has locked record I and needs to access record II, while process B has locked record II and needs to access record I.

Techniques for dealing with deadlocks have been developed. These involve some form of deadlock detection (which may be a simple timing mechanism that assumes that a deadlock exists if a process remains active for too long, or possibly remains active but with nothing happening for too long). Deadlock detection must be followed by some form of deadlock breaking, which will normally involve abandoning at least one of the deadlocked processes.

Although this is not normally regarded as a system failure, its practical effects are largely equivalent to a system failure. Thus the fact that at least one process has been abandoned part way through is closely equivalent to a system failure which occurs while a process is running. The recovery from a deadlock is therefore normally achieved in the same way as from a system failure, and uses the same techniques.

SPECIFIC BACKGROUND

A specific aspect of the general requirement for the system to be able to recover from failures concerns transactions. A transaction is an operation that involves more than one fundamental operation of the system. A simple example is in an accounting system, where two accounts may be held on two different processors in the system, and a transaction involves the transfer of a given sum from one account to the other, thus involving operations on the two different processors.

It is essential that a transaction should be organized in such a manner that no transaction can be only partially performed; a transaction must be completed once it has started. In other words, a transaction must behave as if it were a single fundamental operation. That is, transactions must be atomic; they must not be divisible into constituent components which can occur independently. Thus the manner in which transactions are organized must exclude the possibility, in the above example, of only one account being changed even if one of the two processors should crash while the transaction is being performed.

Considering this in more detail, when a transaction is initiated, the various data records involved are initially in known and retrievable states. (That is, if there is a failure during the performance of the transaction, the system can be reset to and restarted from the initial state using transaction history information or records.) As the process of performing the transaction proceeds, so these records become changed. When the transaction is finished, these records all exist in their new states as well as in their old (initial) states. At this point, the old states of the records can be forgotten, with their new states being known and retrievable, so that if the system should fail at some time in the future, it can be backed up to this current state. (The term "updating" can be used for this process of forgetting an old reference version of a data record and making a new version the reference version.)

A potential difficulty arises in implementing this, because this requires the states of a number of different data records on different machines to be simultaneously updated. The system must therefore be designed so that it is impossible for some data records to be updated while others (because of some system failure during the processing of the transaction) are not. In other words, the system must be designed to ensure that the updating of the data records involved in a transaction is an all-or-none process even in the event of a failure during the transaction.

Of course, if there has been a failure somewhere during the processing of the transaction—either of one of the processors involved or of one of the communication links between them—then the transaction is abandoned, and the system is restored to its previous state. If the transaction is being driven by an operator, then the fact that it has not been performed will generally be immediately apparent to the operator, who can try it again or adopt some other suitable procedure. If it is the processing of, say, one item of a file of items to be performed, then one event in performing the transaction will be the deletion of that item from the file; if the transaction is not performed, then that item will not be deleted but will remain in the file, and can for example be tried again later.

There is a well-known technique for organizing transactions to ensure consistent updating, known as the 2-phase (2P) commit procedure or protocol. This basic 2P protocol has been the subject of a number of extensions and developments. An article summarizing some of these is "Transaction Management in the R* Distributed Database Management System", by C. Mohan, B. Lindsay, and R. Obermarck, ACM Transactions on Database Systems, Vol 11, No 4, December 1986, pages 378–395.

Transaction management (committal) protocols can conveniently be explained with reference to FIG. 1, which is a simplified block diagram of part of a distributed processing system. Five processors 10 to 15 are shown, all connected to a communication system 20 to which any further processors (not shown) of the system are also connected. The communication system 20 is shown as a simple bus, but may be of any form. The processors are essentially all equivalent. They are shown in a hierarchial arrangement, indicated by their differing levels and the arrows between them, but this hierarchy is temporary and represents only the relations between them imposed by the particular transaction under consideration.

As a matter of terminology, the term "operation" has hitherto been used here without being defined precisely. To discuss transaction protocols, it is desirable to use the more precise term "process" for something which is confined to a single processor. The transaction thus involves two or more processors, and consists of a separate process on each of those processors. (As trivial generalization, a transaction may have two or more separate processes on a single processor.) It should also be noted that the "data records" discussed above are distinct from various types of transaction records created and logged (that is, stored in logs in various ways) in the course of the transaction for the purpose of controlling the progress of the transaction.

The basic 2P protocol can be explained by considering a transaction involving a hierarchy of only 2 levels, with a master process on one processor (processor 10) and subordinate processes on three further processors (processors 11 to 13). The master process of the transaction initiates the transaction when it discovers that it requires operations to be performed on processors 11 to 13.

The 2P commit protocol involves two phases of processing after the main operation of the transaction itself has taken place. The first phase is broadly an inquiry phase, and the second is broadly a committal (or abort) phase. It is convenient for each processor to include a transaction manager which initiates the transaction protocol when a process discovers that it requires a transaction to be performed.

FIG. 2 shows in simplified form the organization of the processor 10 (the organizations of the other processors 11 to 15 is the same). It includes a control unit 30 including a transaction manager section 33, a permanent memory 31 (commonly referred to as "disc"), and a volatile memory 32 (commonly referred to as "RAM"). The memory 31 includes an area 34 which is used as a log for storing log records, and the memory 32 includes a buffer area 35 which is also used for storing log records.

The 2P protocol generates various log records, which have to be stored. It will be realized that records stored in memory area 34 are permanent, in the sense that they are not lost on a processor crash but can be accessed after the processor has been restarted. (The area 34 can be identified even after a processor crash; this area 34 can be, for example, at a physically fixed location, or identified by an identifier in a physically fixed location.) The contents of the buffer 35 are however lost on a processor crash.

The loss of certain of the log records would be disastrous; these log records have to be stored on the permanent storage area 34 immediately as they are created. The term "force-write" will be used for the writing of a log record directly onto the permanent area 34. In the simple form of the 2P protocol, all writes are force-writes. (The alternative, writing to disc via the buffer 35, is discussed below.)

For the first phase of the 2P protocol, the transaction manager or the master processor 10 (which we will term the coordinator) sends out a PREPARE message to each of the subordinate processors 11 to 13. Each subordinate, when it receives a PREPARE message, determines whether or not it is prepared to commit the transaction. If it is, then it writes a prepare log record and then returns a YES VOTE message to the coordinator indicating that it is prepared to commit itself to completing the transaction; if it is not prepared to commit itself, it writes an abort log record and returns a NO VOTE message indicating that it is not able to commit itself to completing the transaction. (In the description herein, ROMAN CAPITALS are used for messages, and lower case italics for log records.)

The second phase starts when the coordinator has received all the VOTE messages. Unanimity of YES VOTE messages is required for the transaction to proceed; a single NO VOTE message is enough to veto committal. If all the VOTE messages are YES VOTEs, then the coordinator writes a commit record in its log (that is, it records in stable storage sufficient information to mark the transaction as committed, and the list of participants or subordinate processors) which takes the transaction to the commit point, whereupon the coordinator sends out COMMIT messages to all the subordinates. Each subordinate, on receiving the COMMIT message, enters the Committing state (to update its data records to the states in which the transaction has been performed), writes a commit record, and sends an ACK (acknowledgement) message to the coordinator. The coordinator waits until it has received all the ACK messages, and then writes an end (or forget) record and "forgets" the transaction.

If any of the VOTE messages is a NO VOTE, then the coordinator writes an abort record (aborting the transaction) and sends an ABORT message to any subordinates which are in the Prepared state or have not yet responded to the PREPARE message. Any subordinate receiving an ABORT message writes an abort record, and aborts and "forgets" the transaction. (Those subordinates which have already sent NO VOTE messages will thus not receive ABORT messages.)

This process is summarized by Tables I to III which are, effectively, flow charts in tabular form, with an arrow preceding and succeeding a message to denote the direction of flow between the coordinator and subordinate processors. Table I shows the process where the transaction is Committed and completed, while Tables II and III show the process for an Abort—Table II for a subordinate which responds with a NO VOTE message and Table III for a subordinate which does not respond or responds with a YES VOTE message.

TABLE I

| Coordinator | Messages | Subordinate |
| --- | --- | --- |
| Initiate transaction commitment | | |
| | >PREPARE> | Write prepare |
| | <VOTE YES< | |
| write commit | | |
| | >COMMIT> | write commit |
| | <ACK< | |
| write end. | | |

TABLE II

| Coordinator | Messages | Subordinate |
| --- | --- | --- |
| Initiate transaction commitment | | |
| | >PREPARE> | |
| | | write abort |
| | <VOTE NO< | |
| write abort and end. | | |

TABLE III

| Coordinator | Messages | Subordinate |
| --- | --- | --- |
| Initiate transaction commitment | | |
| | >PREPARE> | |
| | | write prepare |
| | <VOTE YES< | |
| write abort | | |
| | >ABORT> | |
| | | write abort |
| | <ACK< | |
| write end. | | |

In more detail, the 2P protocol works as follows. (The present description incorporates certain minor modifications which take the protocol towards the PA (Presumed Abort) protocol, discussed further below.)

We have merely referred so far to log records generally. More specifically, when the transaction is initiated, the coordinator chooses a unique identifier (TID) for the transaction; all records relating to that transaction will include that identifier. When the transaction is initiated, the coordinator starts to construct a record which includes the TID and the identifiers of the various subordinates which become involved; this record is held in volatile memory or RAM. During the transaction, each subordinate also constructs a record in its RAM concerning the transaction, including the TID and the identifier of the coordinator.

If the coordinator crashes while the transaction is being performed, its RAM record will disappear. For recovery, the coordinator restarts from the state which existed before the transaction started. Therefore, as far as it is concerned, it has no record of the transaction and the transaction does not exist.

This leaves the subordinates with the unfinished transaction pending. This situation can be dealt with by, for example, using timers in the processors which detect when a pending transaction has been dormant for a long time. Each of these subordinates will therefore, in due course, find that it has a dormant transaction record in RAM, and send an inquiry to the coordinator about that transaction. The coordinator will have no record of the transaction, and will accordingly send back an ABORT message. The subordinate will thereupon abort the transaction and "forget" it.

When the processing involved in the transaction is complete, the coordinator uses its transaction record in RAM to discover the subordinates for that transaction, and sends PREPARE messages to them. When a subordinate receives a PREPARE message, it determines whether or not it has successfully completed the processing involved in the transaction. If it has not, then it may or may not still have the transaction record in its RAM. In either case, it sends back a NO VOTE message to the coordinator, and if the record in its RAM has not already been lost, it erases it to "forget" the transaction.

The coordinator, on receiving a NO VOTE message, sends out ABORT messages to any other subordinates which have replied to its PREPARE inquiry with YES VOTE messages and erases its RAM record to "forget" the transaction. If it receives a YES VOTE message from a subordinate after it has erased its RAM record for the transaction, it again sends back an ABORT message. Also, if the coordinator has crashed after sending out the PREPARE messages, it will find, when it receives the VOTE messages back from the subordinates, that it has no record of that transaction, and will again send back ABORT messages regardless of whether the VOTE messages were YES VOTE or NO VOTE messages.

However, if the coordinator receives YES VOTE messages from all subordinates and has not lost its own transaction record, it writes a commit record to disc and returns COMMIT messages to all subordinates. The commit record includes the TID, of course, and the identities of all the subordinates.

If a subordinate has successfully completed its part of a transaction, then when it receives a PREPARE message from the coordinator, it will write a prepare record to disc and return a YES VOTE message. It will then receive, from the coordinator, a further message, which may be either ABORT or COMMIT. If it receives an ABORT message, then it writes an abort record to disc, and restores itself to the state before the transaction was started. If the message is COMMIT, then the subordinate writes a commit record to disc and updates its data records to the state where the transaction has been performed (so abandoning the reference copies of the data records in the state before the transaction was started).

If a subordinate should crash after entering the PREPARED state, then it has the prepare record in its disc log, and can always recover, whether it eventually receives a COMMIT or an ABORT message from the coordinator.

If the transaction has been committed, then each subordinate, as it responds to the COMMIT message, sends back an ACK (acknowledgement) message to the coordinator. As the coordinator receives each ACK message, so it writes to disc a new commit record with that subordinate deleted from the list of subordinates. When the ACK message from the last subordinate is received, the coordinator writes a forget record to disc.

If, after committing the transaction, either the coordinator or a subordinate should crash, or a COMMIT or ACK message should get lost through a communication system failure, then the timer of any processor which remains with the protocol uncompleted for too long will detect that fact, and that processor will send out a suitable further message, which may be a repetition of a previous message or an inquiry message. The receiving processor will, of course, take the appropriate action if the message is a repetition of one which was lost in transmission. If it receives a message a second time, then it replies by sending back a repetition of its first response but takes no further action. If it receives an inquiry message, then it again sends back a repetition of its last response but takes no further action.

The term "forgetting" has been used above. Forgetting usually involves a number of steps, though the final result is always the same. If a processor receives a message about a transaction which calls for a response, then it searches for any records it may have on that transaction in RAM. If it finds a forget record, then it sends an appropriate response. If it finds nothing in RAM, then it searches back through its log of records on disc. Again, if it finds a forget record, then it sends an appropriate response.

However, if there is such a record on disc it could in principle be indefinitely far back, or there may be no record on disc at all. To prevent the need for searches indefinitely far back through the log, therefore (in other situations as well as this), each processor carries out a periodic log check point updating. This involves placing a marker in the log, searching through the log back to a suitable check point (e.g. the last marker), discarding any log entries which are no longer active, and writing into the log (following the new marker) those log entries which are still active. A forget record is regarded as no longer active, and is therefore discarded at the check point (along, of course, with any earlier records in the log relating to the same transaction).

It has been assumed so far that all log records are force-written. With some records, however, their loss within a short time of their creation would not be disastrous. These log records can therefore be stored initially in the buffer area 35, and transferred to the permanent area 34 later. The term "lazy-write" will be used for the writing of a log record onto the buffer 35 with later copying onto the permanent area 34.

Force-writing involves a substantial time delay, typically in the region of 30 ms, because of the physical delays of disc rotation, track finding, etc, and the 2P protocol can only proceed after the force-write has been performed. Hence a force-write greatly extends the time taken by the protocol. Lazy-writing, in contrast, involves substantially no time delay, as the protocol can proceed immediately after the lazy-write (although some activity, typically clean-up related, will have to wait for the lazy-write to be completed by writing to disc). The copying of the log record from the buffer 35 to the area 34 can be left until some convenient later time, usually when some other record is force-written (or possibly if the buffer becomes full).

If a processor crashes after a record has been lazy-written but before it has been copied to disc, then the recovery procedure may involve sending an inquiry message to another processor. This will obviously involve considerable time and processing. However, processor crashes are rare enough that the time saving in using lazy-writing whenever possible outweighs the cost of recovery in the relatively rare event of a crash.

The coordinator can lazy-write its log records in response to the ACK messages. If the coordinator crashes during this sequence of records, then it will lose some of the ACK messages, and eventually send enquiries to the subordinates whose ACK messages it has lost. A subordinate receiving such an inquiry will have "forgotten" the transaction, and return a message to that effect. The coordinator will take this as equivalent to an ACK, since it shows that the subordinate must have received the earlier COMMIT message and taken the appropriate action. Of course, if the subordinate had never received that earlier COMMIT message, then it interprets the inquiry message as a COMMIT message, and duly commits and returns an ACK message.

As a further slight variation, the writing of the commit record by a subordinate can also be a lazy-write. This can only cause a problem if the coordinator has had a problem or has failed to receive the subordinate's ACK message. In this case, the coordinator will send an inquiry to the subordinate. If the subordinate has lazy-written the commit record and lost that record, it will be because it has crashed. On recovery, it will have found the prepare record in its log, and will have recovered to the Prepared state. It will therefore interpret the inquiry as a commit record, and respond by updating itself and lazy-writing its commit record again) and returning an ACK message.

If the subordinate has copied the commit record to disc, finished commit processing, forgotten the transaction, and then passed a check point, then if it receives an inquiry from the coordinator about the transaction, it will return a message indicating that it has forgotten the transaction. This indicates that the transaction has been completed satisfactorily by the subordinate, because if it had not been, the prepare record would still be in its log. The coordinator which sent the inquiry will treat the response as an ACK message.

In practice, the hierarchy may well be a multi-level hierarchy, as for example that shown in FIG. 1. In that arrangement, processor 10 is the head or primary coordinator, and processor 13 is an intermediate processor; it is a subordinate to the processor 10, but is also a coordinator for its subordinate processors 14 and 15.

The protocol as so far described is restricted to a 2-level hierarchy of processors (coordinator level and subordinate level). It can readily be extended to multi-level hierarchies, by requiring each intermediate processor to initiate its own 2-level 2P protocol downwards to its immediate subordinates. If it enters the Prepared state, in due course it receives an ABORT or COMMIT message from above, and propagates this downwards to its subordinates. Obviously, the transaction record of such a coordinator-subordinate must contain the TID (transaction identifier), the identifier of its coordinator, and the identifiers of its subordinates.

A further elaboration of the 2P protocol has also been described in the above-mentioned paper; the presumed abort (PA) protocol. (The paper also describes another elaboration, the presumed commit (PC) protocol, but that is not relevant to our purposes.)

In the presumed abort protocol, the 2P protocol is modified for read-only processes—processes which involve only the reading of information, with no writing (modification) of the information. If a processor receives a PREPARE message and finds that the process involved is a read-only process, then it returns a READ VOTE instead of a YES VOTE message; the READ VOTE is treated by the coordinator as a YES VOTE. (If the processor is an intermediate one, then it can only send a READ VOTE message if all the messages it receives from its subordinates are READ VOTE messages.) A subordinate sending a READ VOTE need take no further action as far as the protocol is concerned; it does not write any log record, and it releases any locks. As the name implies, aborts are generally not acknowledged in the presumed abort protocol.

The length of time for which a transaction is active should obviously not be unduly extended. Thus, other things being equal, each processor should be allowed to forget the transaction as soon as possible. As far as a coordinator is concerned, this point is clearly the point at which it is certain that it will never have to answer a query from a subordinate about the outcome of the transaction. A coordinator therefore has to retain a record of the transaction, in respect of a subordinate, until that subordinate has either logged the outcome of the transaction or forgotten the transaction (completed its clean-up of its records regarding that transaction).

There are two objectives which affect the merit of any particular variant of these protocols. On the one hand, it is desirable for the total time taken by a transaction to be minimized; on the other it is desirable to maximize the possible system through-put. The time taken can be minimized by reducing the number of lazy-writes (each of which keeps the transaction "alive" until it is copied to disc), and this also reduces the amount of system resources tied up by the transaction. Maximizing the possible through-put involves minimizing the amount of processing, and this means minimizing the number of force-writes (since each force-write involves a disc access, whereas lazy-writes are queued and so require effectively only a very short time for writing to disc). Thus a compromise has to be effected between these two objectives, depending on their relative importance.

The foregoing and other objectives of the invention will be understood by a reading of the specification when taken in conjunction with the drawings in which like reference numerals refer to like elements in the several views.

SUMMARY OF THE PRESENT INVENTION

According to the present invention there is provided a transaction management protocol for a computer system comprising a plurality of processors which are organized in a multi-level hierarchy for the transaction, the protocol comprising: a Prepare phase in which PREPARE messages are distributed down through the hierarchy, VOTE messages are returned up the hierarchy, and prepare records are force-written as the VOTE messages are returned; and a Commit phase in which, if committal is to proceed, COMMIT messages are distributed down through the hierarchy, Commit activity is performed and commit records are written as the COMMIT messages are received, and ACK messages are returned up the hierarchy; and wherein commit records are written only by processors in which data records have been changed, and the ACK messages are returned in strict sequential order up the hierarchy and end records are lazy-written as the ACK messages are received.

DESCRIPTION OF THE PREFERRED EMBODIMENT

Figure 1:
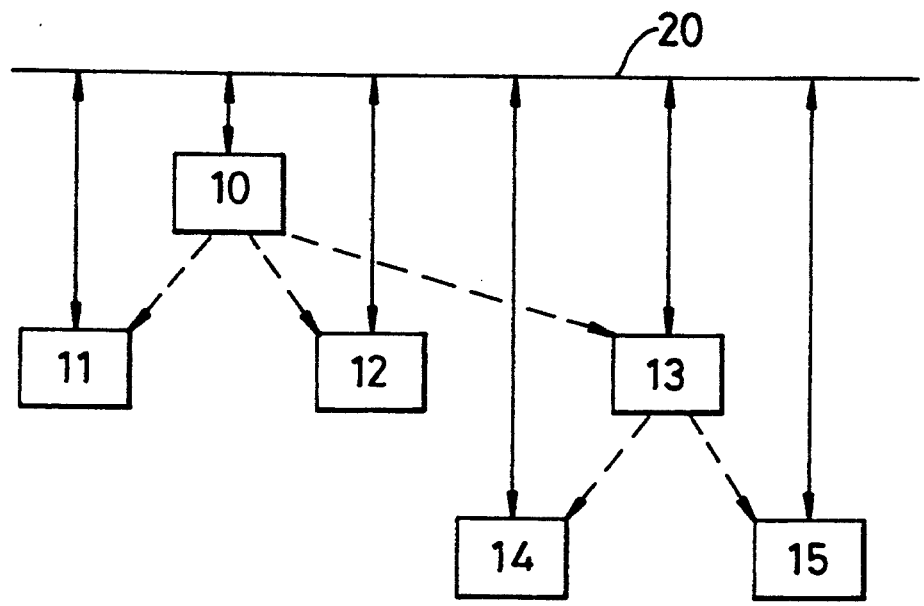
FIG. 1 is a simplified block diagram of part of a distributed processing system.

Referring again to the drawings, FIG. 1 shows a simplified block diagram of part of a distributed processing system having five processors 10 to 15, all connected to a communication system 20, such as a bus, to which any further processors (not shown) of the system are also connected. The processors are shown in a hierarchial arrangement, indicated by their differing levels and the arrows between them, but this hierarchy is temporary and represents only the relations between them imposed by the particular transaction under consideration.

For the basic 2P protocol, for a transaction involving a hierarchy of only 2 levels, with a master process on one processor (processor 10) and subordinate processes on three further processors (processors 11 to 13), the master process of the transaction initiates the transaction when it discovers that it requires operations to be performed on processors 11 to 13.

The 2P commit protocol involves two phases of processing after the main operation of the transaction itself has taken place. The first phase is broadly an inquiry phase (in which the coordinator sends messages to the subordinates to determine if the subordinates are willing to commit to the transaction), and the second is broadly a committal (or abort) phase. It is convenient for each processor to include a transaction manager which initiates the transaction protocol when a process discovers that it requires a transaction to be performed.

Figure 2:
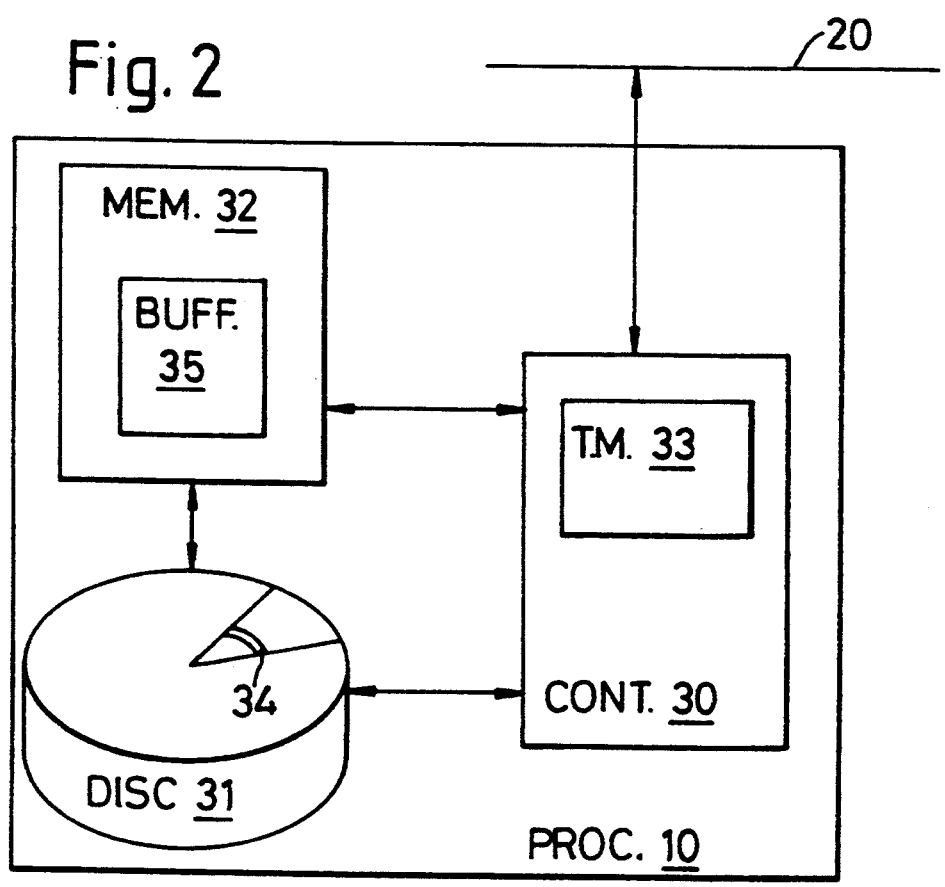
FIG. 2 shows in simplified form the organization of one of the processors in the system of FIG. 1.

Referring also to FIG. 2, the organization of the processor 10 (as well as processors 11 to 15) includes a control unit 30 including a transaction manager section 33, a permanent memory 31 (such as a disc), and a volatile memory or RAM 32. The memory 31 includes an area 34 which is used as a log for storing log records, and the memory 32 includes a buffer area 35 which is also used for storing log records.

For the first phase of the 2P protocol, (See Table I), the transaction manager 33 on the master processor 10 (which we will term the coordinator) initiates a transaction commitment and sends out a PREPARE message to each of the subordinate processors 11 to 13. Each subordinate, when it receives a PREPARE message, determines whether or not it is prepared to commit the transaction. If it is, then it writes a prepare log record and then returns a YES VOTE message to the coordinator indicating that it is prepared to commit itself to completing the transaction; if it is not prepared to commit itself (See Table II), it writes an abort log record and returns a NO VOTE message indicating that it is not able to commit itself to completing the transaction.

In practice, the hierarchy may well be a multi-level hierarchy, as shown in FIG. 1, wherein processor 10 is the head or primary coordinator, and processor 13 is an intermediate processor; it is a subordinate to the processor 10, but is also a coordinator for its subordinate processors 14 and 15. In accordance with the present invention there is provided a multi-level hierarchy protocol for use in the distributed processing system of FIG. 1, which protocol is a modification and elaboration of the PA protocol, and can conveniently be termed "early forget". In this "early forget" modification, a coordinator is allowed to forget the participation of a subordinate as soon as the protocol has reached the point at which the subordinate's actions on recovery from a crash would be independent of the outcome (commit or abort) of the protocol. This can occur substantially earlier than the point at which the subordinate has reached a state where it will never query the outcome of the transaction.

The protocol is the same as the PA protocol for the first phase, which ends and enters the second phase when the coordinator decides to commit the transaction and force-writes its commit log record and sends the COMMIT messages. When an intermediate processor receives a COMMIT message, it passes it on to its subordinates and awaits their responses. Once all its subordinates have sent ACK messages to a coordinator, the coordinator can "clean up" its records.

In the 2P and PA protocols, this "clean-up" can proceed in two possible ways. One way involves a lazy-write to remove the transaction's prepare record from permanent storage, or a lazy-write of the commit log record on receiving the COMMIT message, with the ACK being delayed until the log records have been transferred to permanent storage 34. This can involve substantial delays, and an accumulation of log records. The other way is to force-erase the prepare log record and force-write the commit log record, followed promptly by the sending of the ACK message. This minimizes delays, but the force-writes impose a heavy processing burden.

The first of these two possible versions of the standard protocol may be summarized by Table IV (considering only what happens if there are no crashes or message losses). Table IV shows a primary coordinator (processor 10), a final subordinate (processor 14 or 15) and an intermediate processor 13 (which is subordinate to processor 10 and a coordinator to processors 14 and 15). Right and left pointing arrow heads preceding and succeeding messages depict the flow direction, while the vertical column is time oriented, that is, the steps in the process are in descending order sequentially down the page. This shows a 3-level hierarchy, but obviously the system may be extended to more levels. Also, for simplicity only one processor is shown at each level; in practice, each coordinator is likely to have several subordinates, and it obviously sends similar messages to and receives similar messages from each. It is also assumed here that the intermediate processor does not have any Commit activity of its own to perform (i.e. it does not have to update any data records of its own).

The first phase of the process is depicted in the upper portion of the table commencing with "initiate transaction commitment" and terminating with the VOTE YES message being returned to the Primary coordinator by the intermediate processor.

It will be noted that in the Commit phase (commencing with the "force-write commit" in the leftmost column), when the intermediate processor receives the COMMIT message, it lazy-writes a commit log record and forwards the COMMIT message to the final subordinates. The two acknowledgement sequences, one from the intermediate processor to the primary coordinator and the other from the final subordinates to the intermediate processor, then proceed independently (as indicated by the log records occupying the same row in the table). The sequence from the intermediate processor to the primary coordinator involves waiting until the intermediate processor performs a clean-up involving the copying of the commit record to disc; as soon as this occurs, the ACK message is sent back to the primary coordinator. For the sequence from the final subordinates to the intermediate processor, the ACK message is sent from each final subordinate as soon as it has performed its Commit activity.

TABLE IV

| Primary Coordinator | Messages | Intermediate processor | Messages | Final Subordinate |
|---|---|---|---|---|
| Initiate transaction commitment | | | | |
| | >PREPARE> | | | |
| | | | >PREPARE> | |
| | | | | force-write prepare |
| | | | <VOTE YES< | |
| | | force-write prepare | | |
| | <VOTE YES< | | | |
| force write commit | | | | |
| | >COMMIT> | | | |
| | | lazy-write commit | | |
| | | | >COMMIT> | |
| | | copy commit to log | | perform Commit actions, lazy-write commit |
| | <ACK< | | | |
| lazy-write end | | | <ACK< | |
| | | lazy-write end | | |

For the second version of the standard protocol, the intermediate processor force-writes the commit log record and sends the ACK message back to the primary coordinator as soon as the log record has been recorded on disc. These sequences are also, of course, subject to minor variations.

The common theme of these sequences is that enough state must have been logged onto disc to ensure that the intermediate processor will know, prior to it sending an ACK message back up to the primary coordinator, that it will never have to query the primary coordinator again.

In the system according to the present invention, as soon as an intermediate processor 13 has received ACK messages from its subordinates 14 and 15, it immediately sends a message to its coordinator 10 that it (the intermediate processor 13) can be removed from the coordinator's record of the list of processors involved in the transaction; that is, the coordinator 10 can forget that processor (the intermediate processor 13) as far as that transaction is concerned. At the same time, the intermediate processor 13 lazy-writes the deletion of its log records for the transaction. The coordinator 10 will normally also lazy-write the log record corresponding to the message it has received from the intermediate processor 13.

Table V shows the corresponding message and log record sequence of the two phases for the system according to the present invention.

TABLE V

| Primary Coordinator | Messages | Intermediate processor | Messages | Final subordinate |
|---|---|---|---|---|
| Initiate transaction commitment | | | | |
| | >PREPARE> | | | |
| | | | >PREPARE> | |
| | | | | force-write prepare |
| | | | <VOTE YES< | |
| | | force-write prepare | | |
| | <VOTE YES< | | | |
| force-write commit | | | | |
| | >COMMIT> | | | |
| | | | >COMMIT> | |
| | | | | perform Commit actions, lazy-write commit |
| | | | <ACK< | |
| | <ACK< | lazy-write end | | |
| lazy-write end | | | | |

It will be seen that the inquiry phase is the same as in the conventional system. However, the committal phase differs in that the intermediate processor does not write any commit log record; further, it forgets the transaction by a lazy-write of an end log record and forwards an ACK message up the chain to the primary coordinator as soon as it has received the ACK messages from its subordinates. This is prior to the end record being written to disc, and can be simultaneous with or prior to the lazy-writing of the end record. In other words, log activity occurs in parallel with ACK messages; log write deeds to have occurred prior to sending the ACK message back up from the intermediate processor to the primary coordinator.

If the intermediate processor fails after it has sent its ACK but before it has forgotten the transaction, then on recovery, it will find the prepare record in its log. It will therefore send an inquiry message to the primary coordinator. If that primary coordinator has already forgotten the transaction, it will return an ABORT message. The intermediate processor will (again) forget the transaction, and take no further action. If the primary coordinator had not forgotten its commit record but does not receive the ACK message, it will in due course send out a commit message again and recovery and clean-up will proceed as normal.

The justification for the present procedure is as follows. Once a processor has completed its processing for a committed transaction, it must not take any action if that transaction is encountered again during a recovery procedure. For example, the system may crash after the processor has completed its processing but before that fact is reported (by an ACK message) to the coordinator's transaction manager (telling the transaction manager that the processing has been done and can be forgotten). In that case, the processor may be asked to recover the transaction when service is restored after the crash; the processor must then be able to detect that there is nothing more to do.

This means that once a processor, in effect, claims that it can be forgotten by its coordinator, the recovery actions become the same—to do nothing regardless of the actual outcome of the transaction. If the processor should receive an abort message, then it will attempt to abort the transaction. However, since the processor has already carried out the Committing actions, its data records will be irreversibly in the states in which the transaction has been performed. It will have lost the ability to return its data records to the states they were in before the transaction was started. The attempted abort can therefore have no effect—i.e., it must leave the data records unchanged, which is just the same as the result of an attempt to repeat a commit.

Allowing a coordinator to forget about a transaction concurrently with a subordinate might result in an incorrect transaction outcome being returned during recovery. The present protocol, however, ensures that no incorrect action will be taken during recovery.

In accordance with the present invention, there has been shown and described a transaction manager using the presumed abort variant of the distributed two phase commit protocol to reclaim space in the transaction history earlier than previously allowed. This then reduces the time necessary to retain transaction history or log information, and thus reduces the necessary storage that a given coordinator processor or transaction manager requires for a given transaction rate. This implies lower amounts of disk storage or memory which must be committed to use by the transaction manager. By way of example, using the traditional two phase commit algorithm, both transaction managers (coordinating processors) remember a transaction for an average of 6 seconds. This algorithm, however, contains an extra forced log operation at the subordinate transaction manager which limits the overall transaction rate. Therefore, if communications between the superior and subordinate transaction managers can be assumed to be good, the extra forced log operation at the subordinate is removed to improve the overall response time and therefore raise the transaction throughput limit. However, this optimization means that the superior transaction manager will remember a transaction for an average of 11 seconds, close to doubling the number of transactions a transaction manager will need to store to correctly operate at full speed. Using the "early-forget" optimization method herein described, the superior transaction manger will again be reduced to remembering a transaction for an average of 6 seconds.

While there has been shown and described a preferred embodiment, it is top be understood that various other modifications may be made without departing from the spirit and scope of the invention.

What is claimed is:

1. A computer system for transaction processing employing a commit protocol for insuring transaction integrity comprising:

a plurality of processors connected for executing a transaction, said transaction comprising a plurality of processes executed by said plurality of processors in the computer system, said plurality of processors being arranged in a multi-level hierarchy, said hierarchy including a coordinator processor for initiating said transaction, an intermediate processor for communicating with the coordinator processor, and a subordinate processor for communicating with the intermediate processor and for executing at least one of said processes of said transaction, each of said processors including transaction control means for generating messages concerning the status of the transaction and the identification of participating processors during and after the execution of the transaction, and further including memory means for storing log records containing said messages;

first communication means for providing and returning said messages between said coordinator processor and said intermediate processor;

second communication means for providing and returning said messages between said intermediate processor and said subordinate processor;

means for executing said at least one of said processes in said subordinate processor in response to said messages; and means in said intermediate processor for communicating messages from the subordinate processor to the coordinator processor immediately after execution of said at least one process by said subordinate processor and without said intermediate processor storing a log record indicating commitment of said intermediate processor to said transaction.

2. The computer system of claim 1 further comprising:

means for determining whether to use or not to use information in said transaction's log record in said memory means of said subordinate processor, once processing for said transaction is complete, during a recovery procedure which attempts to make operable said computer system after a failure.

3. The computer system of claim 2 wherein said means for ignoring further comprises:

means for permitting said intermediate processor to query said coordinator processor to determine a status concerning said transaction during said recovery; and means for sending a message requiring execution of said one of said processes by said subordinate processor from said coordinator processor to said intermediate processor in response to said query if said coordinator processor has not completed said transaction or if said coordinator processor does not receive a message confirming execution of said process by said subordinate processor from said intermediate processor.

4. The computer system of claim 3 wherein said means for ignoring further comprises:

means for sending a message from said coordinator processor to said intermediate processor directing said intermediate processor to abort said transaction in response to said query if said coordinator processor has completed said transaction and deleted said log record of completion of said transaction for said coordinator processor.

* * * * *